US011429652B2

(12) United States Patent
Alkan et al.

(10) Patent No.: US 11,429,652 B2
(45) Date of Patent: Aug. 30, 2022

(54) CHAT MANAGEMENT TO ADDRESS QUERIES

(71) Applicant: International Business Machines Corporation, Armonk, NY (US)

(72) Inventors: Oznur Alkan, Clonsilla (IE); Adi I. Botea, Dublin (IE); Bei Chen, Blanchardstown (IE); Elizabeth Daly, Dublin (IE); Massimiliano Mattetti, Dublin (IE); Inge Lise Vejsbjerg, Kilmainham (IE)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 16/589,234

(22) Filed: Oct. 1, 2019

(65) Prior Publication Data
US 2021/0097097 A1    Apr. 1, 2021

(51) Int. Cl.
*G06F 16/33*     (2019.01)
*G06F 16/332*    (2019.01)

(52) U.S. Cl.
CPC ...... *G06F 16/3344* (2019.01); *G06F 16/3329* (2019.01)

(58) Field of Classification Search
CPC .................................................. G06F 16/3344
See application file for complete search history.

(56) References Cited

U.S. PATENT DOCUMENTS

| | | | |
|---|---|---|---|
| 8,046,259 B1 | 10/2011 | Siegel et al. | |
| 8,996,437 B2 | 3/2015 | Brillhart et al. | |
| 9,269,070 B2 | 2/2016 | Sreenivasan et al. | |
| 2009/0276419 A1* | 11/2009 | Jones | G06F 16/3322 707/999.005 |
| 2012/0095978 A1* | 4/2012 | Levin | G06F 16/9535 707/706 |
| 2013/0018913 A1* | 1/2013 | Jones | G06F 16/951 707/769 |
| 2013/0110830 A1* | 5/2013 | Vadlamani | G06F 16/951 707/723 |
| 2013/0332537 A1 | 12/2013 | Emerick et al. | |

(Continued)

FOREIGN PATENT DOCUMENTS

EP    3402137 A1    11/2018

OTHER PUBLICATIONS

Wang et al., "On mining latent topics from healthcare chat logs", Journal of Biomedical Informatics, Available Online Apr. 28, 2016, pp. 247-259.

(Continued)

*Primary Examiner* — Van H Oberly
(74) *Attorney, Agent, or Firm* — James L. Olsen

(57) ABSTRACT

Aspects of the present disclosure relate to chat management to address queries. A query can be received. A determination can be made whether the query has already been answered by comparing the query to text within a chat database. In response to determining that the query has not been answered, a set of prospective experts can be identified. Each of the prospective experts of the set of prospective experts can be ranked based on at least one factor. The query can be transmitted to a first ranked expert. An answer to the query can then be received from the first ranked expert.

11 Claims, 8 Drawing Sheets

(56) References Cited

U.S. PATENT DOCUMENTS

| | | | |
|---|---|---|---|
| 2014/0297571 A1* | 10/2014 | Beamon | G06F 16/313 |
| | | | 706/46 |
| 2015/0149177 A1 | 5/2015 | Kalns et al. | |
| 2016/0203523 A1* | 7/2016 | Spasojevic | G06Q 30/0269 |
| | | | 705/14.66 |
| 2017/0366607 A1 | 12/2017 | Juhlin et al. | |
| 2018/0025726 A1 | 1/2018 | Gatti de Bayser et al. | |
| 2018/0129673 A1* | 5/2018 | Pandey | G06Q 10/063112 |

OTHER PUBLICATIONS

Ramachandran et al., "Automated Chat Thread Analysis: Untangling the Web", Interservice/Industry Training, Simulation, and Education Conference (I/ITSEC) 2010, 13 pages, <https://apps.dtic.mil/dtic/tr/fulltext/u2/a532774.pdf>.

Hung et al., "Towards a Context-Based Dialog Management Layer for Expert Systems", International Conference on Information, Process, and Knowledge Management, Feb. 1-7, 2009, 6 pages.

Chandar et al., "Leveraging Conversational Systems to Assists New Hires During Onboarding", Human-Computer Interaction—INTERACT 2017, First Online: Sep. 20, 2017, 8 pages, Abstract Only, <https://link.springer.com/chapter/1 0.1007/978-3-319-67684-5_23>.

Ehrlich et al., "Searching for experts in the enterprise: combining text and social network analysis", Proceedings of the 2007 international ACM conference on Supporting group work, Nov. 4-7, 2007, pp. 117-126, <https://dl.acm.org/citation.cfm?id=1316642>.

Mell et al., "The NIST Definition of Cloud Computing", Recommendations of the National Institute of Standards and Technology, Sep. 2011, 7 pages.

\* cited by examiner

US 11,429,652 B2

CHAT MANAGEMENT TO ADDRESS QUERIES

BACKGROUND

The present disclosure relates generally to the field of chat management, and more specifically, to chat management to address queries.

SUMMARY

Embodiments of the present disclosure relate to a method, computer program product, and system for chat management to address queries. A query can be received. A determination can be made whether the query has already been answered by comparing the query to text within a chat database. In response to determining that the query has not been answered, a set of prospective experts can be identified. Each of the prospective experts of the set of prospective experts can be ranked based on at least one factor. The query can be transmitted to a first ranked expert. An answer to the query can then be received from the first ranked expert.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
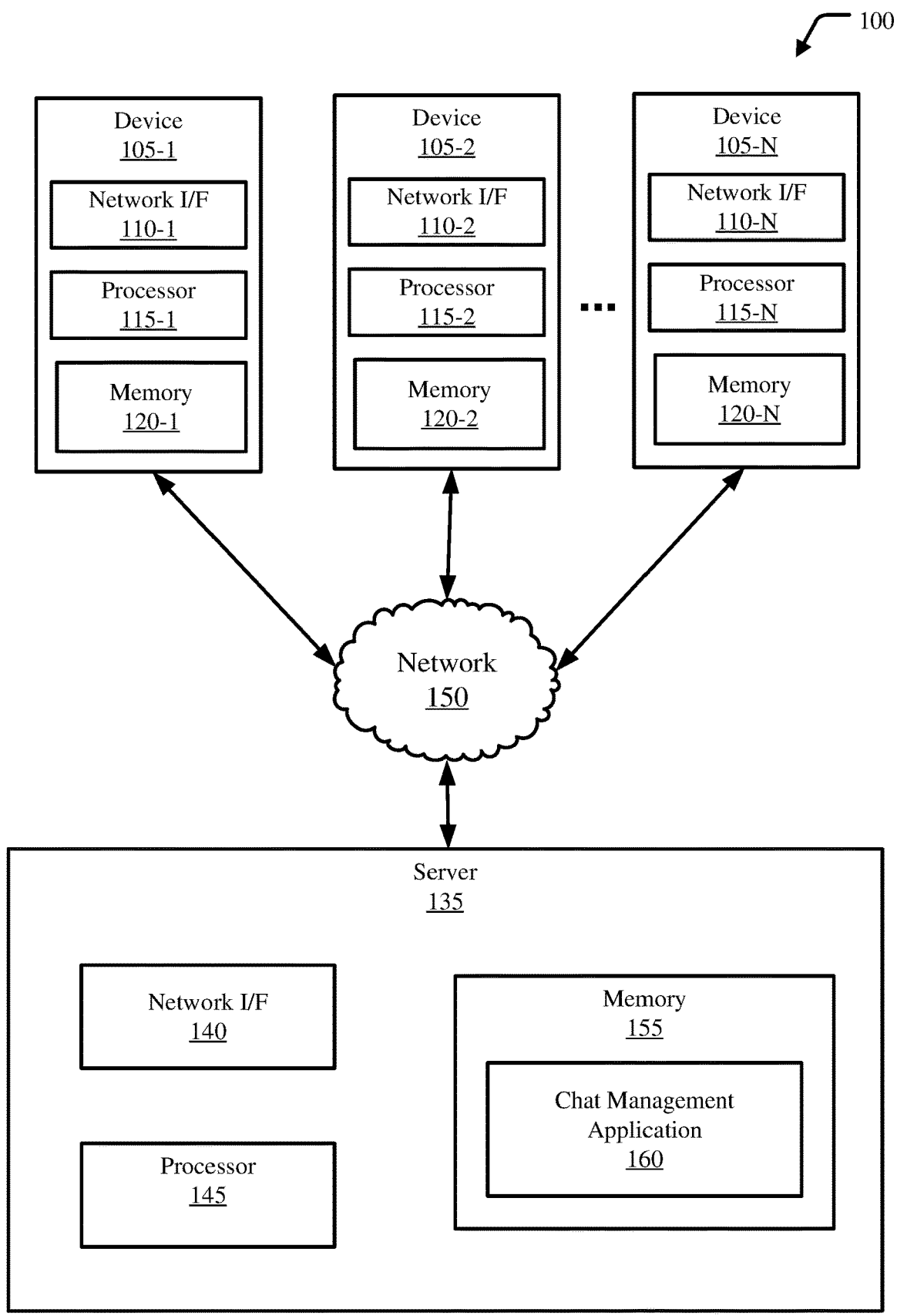
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of chat management, and in particular, to chat management to address queries. While the present disclosure is not necessarily limited to such applications, various aspects of the disclosure can be appreciated through a discussion of various examples using this context.

In an instant messaging (IM), group chat, or collaboration environment ("chat forum"), users can communicate using text in real-time over the Internet or another network. This enables users to engage one another without the need to meet in person or over the phone. Often times, these environments facilitate a forum in which users can ask and answer questions, engage in conversations, and collaborate on work. However, in some situations, a user may have a question (i.e., a query) and may not know who to direct the question to over the chat forum. This can lead to the user parsing through a contact list to attempt to find a suitable answer from an individual. After all this, the user may still not find an answer to their question.

It is also possible that the user's query has already been correctly answered in the past, but the user cannot access the answer. This is because chat history logs are typically stored in a chat database, and a user often cannot access chat history that they are not involved in. As such, aspects of the present disclosure recognize the need to utilize existing chat history logs to address previously answered queries.

In the event that the query has not been already answered, it would be greatly beneficial to locate a user (e.g., an expert) who likely knows the correct answer. However, in a chat forum with hundreds or thousands of potential prospective experts, it is difficult for a user to locate the appropriate individual to address their query. As such, aspects of the present disclosure also recognize the need to identify experts capable of addressing queries posed by users.

Aspects of the present disclosure relate to chat management to address queries. A query can be received from a user. The query can be compared to a chat database to determine whether the query has already been answered. If the query has already been answered, the user can be presented with the answer (e.g., the user can be directed to the chat log including the query and answer). If the query has not been answered, prospective experts that may be capable of answering the query can be identified. The prospective experts can be ranked based at least one factor (e.g., years of experience, job title, education, etc.). The query can then be transmitted to a first ranked expert of the prospective experts. If the first ranked expert is not available to answer the query (e.g., the first ranked expert does not respond to the query within a predetermined amount of time), the ranked list of experts can be iterated through until the query is answered. The answer can then be transmitted to the user and stored in the chat database for future reference.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 each include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other, and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes a chat management application 160. The chat management application 160 can be configured to manage responses to queries posed by users (e.g., received from devices 105). To do so, the chat management application 160 can be configured to receive a query and compare the query (e.g., using natural language processing (NLP) techniques) to text within a chat database to determine whether the query has already been answered. If the query has been answered, the answer can be retrieved and validated. In embodiments, upon validating the answer, the answer can be transmitted to the user.

If a determination is made that the query has not been answered (e.g., based on the results of the comparison), the chat management application 160 can be configured to identify prospective experts who may be capable of answering the query by referencing an expert database. The chat management application 160 can then be configured to rank the prospective experts based on a variety of criteria (e.g., experience, education, credentials, work history, etc.) relevant to the query. The query can then be transmitted to a first ranked expert (e.g., an expert that is likely to have an answer to the query based on the ranking algorithm). In some embodiments, a chat room (e.g., an instant messaging channel) is automatically created between the querying user and the expert. In embodiments, if the first ranked expert is not available, then the ranked list of experts is iterated through until an available expert is reached. In embodiments, if a predetermined amount of time (e.g., 5 minutes, 30 minutes, 1 hour) passes without a response, a determination can be made that the expert is not available, and the next expert in the list can be contacted.

Though this disclosure pertains to the collection of personal data (e.g., chat history and personal expert data), it is noted that in embodiments, users opt-in to the system (e.g., the chat management application 160). In doing so, they are informed of what data is collected and how it will be used, that any collected personal data may be encrypted while being used, that users can opt-out at any time, and that if they opt-out, any personal data of the user is deleted.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
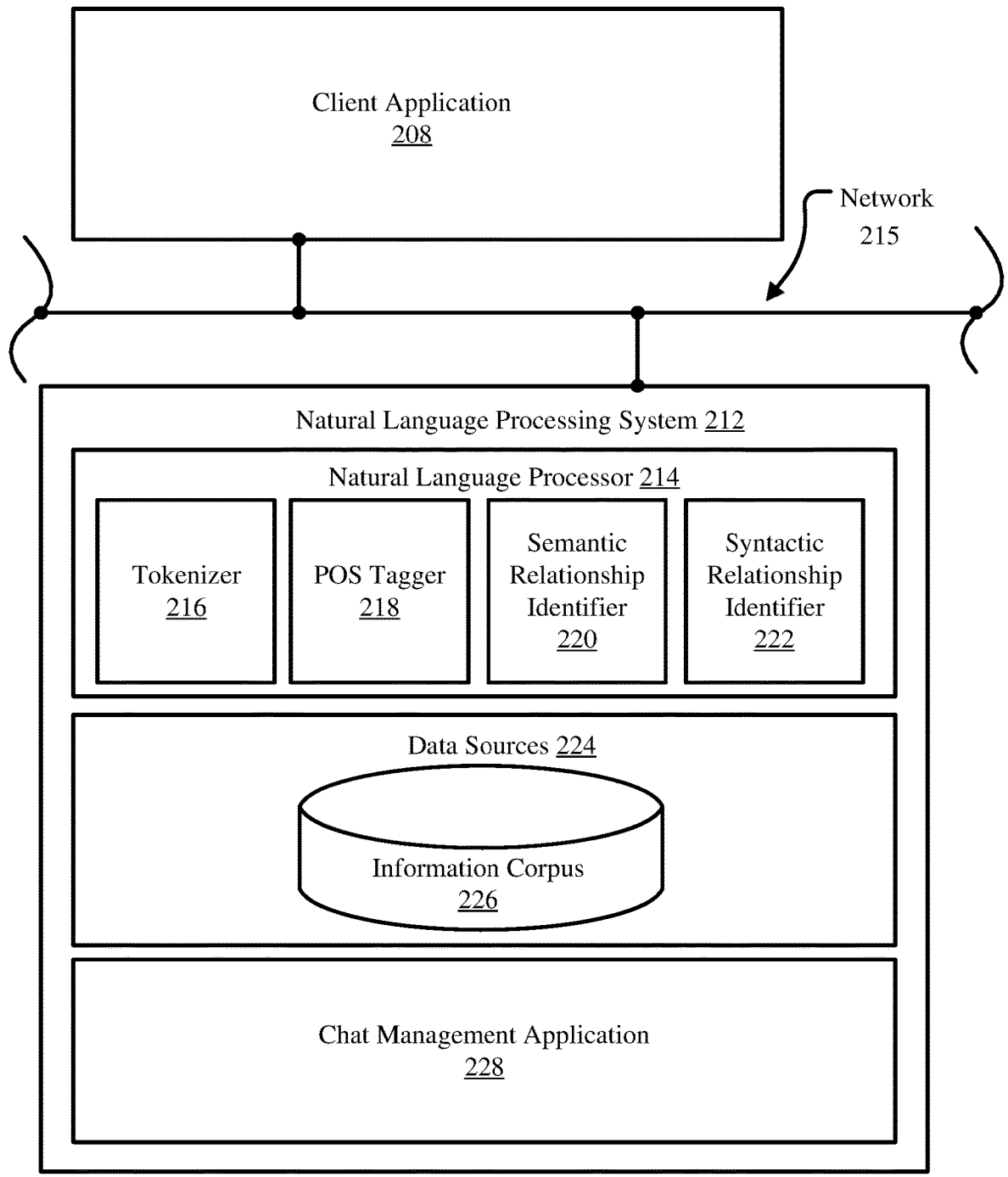
FIG. 2 is a block diagram illustrating a natural language processing system configured to process unstructured data inputs, in accordance with embodiments of the present disclosure.

Turning now to FIG. 2, illustrated is a block diagram of an example natural language processing system 212 configured to process unstructured data inputs (e.g., chat history within a chat database), in accordance with embodiments of the present disclosure. In some embodiments, a remote device (e.g., device 105-1 of FIG. 1) can submit input data to be analyzed by the natural language processing system 212, which can be a standalone device, or part of a larger computer system (e.g., server 135). The natural language processing system 212 can include a client application 208, which can itself involve one or more entities operable to generate or modify unstructured input data that is then dispatched to the natural language processing system 212 via a network 215.

Consistent with various embodiments, the natural language processing system 212 can respond to electronic document submissions sent by a client application 208. Specifically, the natural language processing system 212 can analyze a received unstructured data input (e.g., a chat history log, an expert profile, text from a website, etc.) such that the unstructured data input can be formatted, summarized, simplified, or otherwise processed.

The natural language processor 214 can be a computer module that analyzes the received unstructured input data from data sources 224 (e.g., web servers, client devices, storage area networks, chat databases, etc.). In some embodiments, the data sources 224 can include an information corpus 226. The information corpus 226 can enable data storage and retrieval. In some embodiments, the information corpus 226 may be a storage mechanism that houses a standardized, consistent, clean, and integrated list of data that has been arranged subject to data quality or data hygiene systems or rules.

The natural language processor 214 can perform various methods and techniques for analyzing electronic documents (e.g., syntactic analysis, semantic analysis, etc.). The natural language processor 214 can be configured to recognize and analyze any number of natural languages. In some embodiments, the natural language processor 214 can parse passages of the documents. Further, the natural language processor 214 can include various modules to perform analyses of electronic documents. These modules can include, but are not limited to, a tokenizer 216, a part-of-speech (POS) tagger 218, a semantic relationship identifier 220, and a syntactic relationship identifier 222.

In some embodiments, the tokenizer 216 can be a computer module that performs lexical analysis. The tokenizer 216 can convert a sequence of characters into a sequence of tokens. A token can be a string of characters included in an electronic input document and categorized as a meaningful symbol. Further, in some embodiments, the tokenizer 216 can identify word boundaries in an electronic document and break any text passages within the document into their component text elements, such as words, multiword tokens, numbers, and punctuation marks. In some embodiments, the tokenizer 216 can receive a string of characters, identify the lexemes in the string, and categorize them into tokens.

Consistent with various embodiments, the POS tagger 218 can be a computer module that marks up a word in passages to correspond to a particular part of speech. The POS tagger 218 can read a passage or other text in natural language and assign a part of speech to each word or other token. The POS tagger 218 can determine the part of speech to which a word (or other text element) corresponds, based on the definition of the word and the context of the word. The context of a word can be based on its relationship with adjacent and related words in a phrase, sentence, or paragraph. In some embodiments, the context of a word can be dependent on one or more previously analyzed data inputs (e.g., the context of a word in a dictionary can describe or bring further meaning to a word or phrase in an encyclopedia). In embodiments, the output of the natural language processing system 212 can populate a text index, a triple store, or a relational database (RDB) to enhance the contextual interpretation of a word or term. Examples of parts of speech that can be assigned to words include, but are not limited to, nouns, verbs, adjectives, adverbs, and the like. Examples of other part of speech categories that POS tagger 218 can assign include, but are not limited to, comparative or superlative adverbs, wh-adverbs, conjunctions, determiners, negative particles, possessive markers, prepositions, wh-pronouns, and the like. In some embodiments, the POS tagger 218 can tag or otherwise annotate tokens of a passage with part of speech categories. In some embodiments, the POS tagger 218 can tag tokens or words of a passage to be parsed by the natural language processing system 212.

In some embodiments, the semantic relationship identifier 220 can be a computer module that can be configured to identify semantic relationships of recognized text elements (e.g., words, phrases) in documents. In some embodiments, the semantic relationship identifier 220 can determine functional dependencies between entities and other semantic relationships.

Consistent with various embodiments, the syntactic relationship identifier 222 can be a computer module that can be configured to identify syntactic relationships in a passage composed of tokens. The syntactic relationship identifier 222 can determine the grammatical structure of sentences such as, for example, which groups of words are associated as phrases and which word is the subject or object of a verb. The syntactic relationship identifier 222 can conform to formal grammar.

In some embodiments, the natural language processor 214 can be a computer module that can parse a document and generate corresponding data structures for one or more portions of the document. For example, in response to receiving an unstructured textual report at the natural language processing system 212, the natural language processor 214 can output parsed text elements from the report as data structures. In some embodiments, a parsed text element can be represented in the form of a parse tree or other graph structure. To generate the parsed text element, the natural language processor 214 can trigger computer modules 216-222.

In embodiments, the output of natural language processor 214 can be used by a chat management application 228 (e.g., chat management application 160 of FIG. 1). For example, the output of the natural language processor 214 can be used to match queries to previously answered queries within a chat database. For example, the natural language processor 214 can be configured to format a query, summarize a query, reword a query, etc. such that queries can be compared. In some embodiments, the natural language processor 214 can be configured to apply matching algorithms between current queries and previously presented queries within a chat database. For example, the natural language processor 214 can be configured to perform term frequency-inverse document frequency (tf-idf), best matching-25 (BM-25), or any other suitable text matching algorithm to compare the current query to a previous query. In embodiments, a string similarity algorithm (e.g., Rabin-Karp, Knuth-Morris-Pratt, Naïve, Boyer-Moore, etc.) can be used to match a current query to a previous query.

In embodiments, the natural language processor 214 can be configured to parse expert information (e.g., located within an expert database) to be used to identify and rank prospective experts who may be capable of answering the query. For example, the natural language processor 214 can be configured to collate expert data from a variety of sources (e.g., social media, employee work pages, universities, employers, etc.), summarize expert profiles, extract keywords from expert profiles, summarize chat logs associated with experts, extract keywords from chat logs associated with experts, and the like such that experts can be selected and ranked based on their ability to answer the query.

Figure 3:
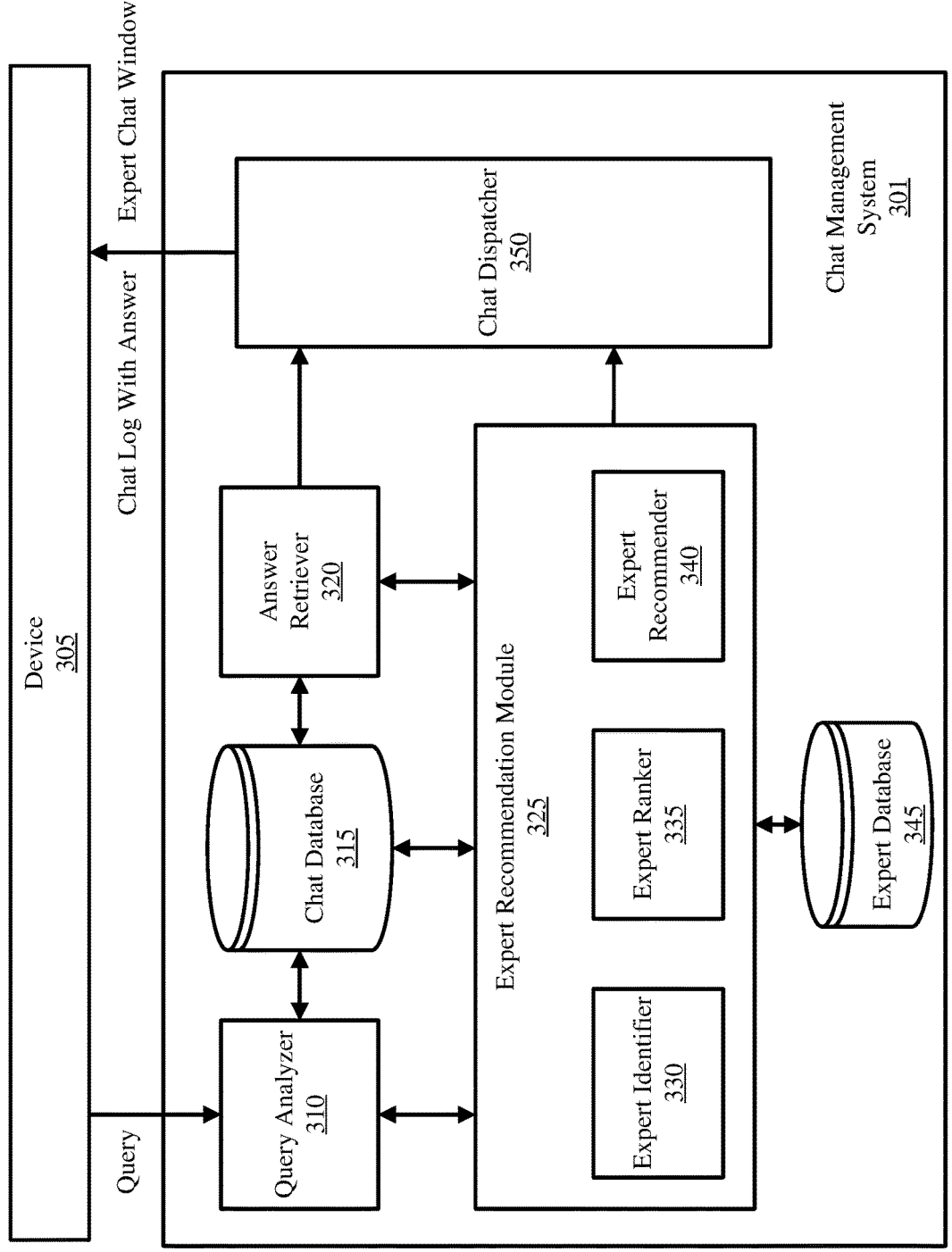
FIG. 3 is a block diagram illustrating an example computing environment including a chat management system, in accordance with embodiments of the present disclosure.

FIG. 3 is a block diagram illustrating an example computing environment 300 in which illustrative embodiments of the present disclosure can be implemented. The computing environment 300 includes a device 305 and a chat management system 301. The chat management system 301 includes a query analyzer 310, an answer retriever 320, an expert recommendation module 325, and a chat dispatcher 350. In embodiments, the query analyzer 310, answer retriever 320, expert recommendation module 325, and chat dispatcher 350 can be processor executable instructions that can be executed by a dedicated or shared processor using received inputs (e.g., from device 305).

Consistent with various embodiments, the query analyzer 310 can be configured to receive queries from devices (e.g., device 305). The query analyzer 310 can receive queries over a network, such as in an instant messaging (IM), collaboration, or group chat environment. In embodiments, the query analyzer 310 can be configured to compare received queries to text stored within a chat database 315 (e.g., a datastore containing textual chat history data which occurred over the instant messaging/chat forum) to determine whether any received queries match queries within the chat database 315. This can be completed such that answers associated with previously answered queries can be retrieved and used to respond to the current query. In some embodiments, the query analyzer 310 can be configured to attempt to find matching queries in other locations, such as search engines, forums, blogs, Q/A (question/answer) websites, etc. on the Internet.

Matching a received query to a previously presented query can be completed using a similarity algorithm. For example, NLP techniques, such as those described with respect to FIG. 2 (e.g., tf-idf, BM-25, Rabin-Karp, Knuth-Morris-Pratt, Naïve, Boyer-Moore, etc.), can be used to match a current query to a previously presented query. In embodiments, a match between a received query and a previously presented query can be determined in response to a similarity value (e.g., output by a matching algorithm) exceeding a similarity threshold.

If a matching query is found (e.g., the query analyzer 310 concludes a match between the received query and a previously presented query), answer retriever 320 can be configured to locate an answer to the query. This can be completed based on metadata associated with the chat. For example, timing metadata associated with the query can be analyzed such that responses occurring shortly after the query was received (e.g., within 5 minutes) can be designated as a response to the query. As another example, responses to queries can be located based on usernames. For example, if a first username presented a query, text associated with a second username occurring after the query can be designated as a response based on the text being transmitted by a second user. In some embodiments, locating an answer to the query can be completed based on keyword matching. For example, keywords associated with a query can be used to locate an answer by identifying keywords within the answer. However, an answer can be located in any other suitable manner. For example, in some embodiments, an answer can be manually located by a user.

In embodiments, after the answer retriever 320 locates an answer, the answer retriever 320 validates the answer (determines whether the answer is likely accurate, and to what degree). This can be completed in a variety of manners. In some embodiments, the answer is validated by referencing an external source, such as an ontology (e.g., a knowledge graph used for information retrieval), a search engine, a website, an encyclopedia, a dictionary, or any other suitable resource. In some embodiments, the answer is validated with the aid of an expert. In these embodiments, the expert can manually indicate whether the answer is valid or invalid.

The output of the answer retriever 320 can include a triple in the format <query, answer, confidence>. The confidence can denote the degree of certainty that the answer is correct for the query. The triple can then be transmitted to the chat dispatcher 350. In some embodiments, the answer retriever 320 simply transmits an answer extracted from the chat database 315 or from an external source (e.g., a search engine, Q/A website, etc.) to the chat dispatcher 350.

In embodiments, if a match is not found between a current query and a previously presented query, the query analyzer 310 can be configured to forward the query to the expert recommendation module 325 such that an expert capable of addressing the query can be contacted. The expert recommendation module 325 includes an expert identifier 330, an expert ranker 335, and an expert recommender 340. The expert identifier 330 can identify a pool (e.g., a list) of prospective experts that may be capable of addressing the query. The expert ranker 335 can rank the pool of prospective experts based on criteria indicative of their abilities to accurately address the query. The expert recommender 340 then selects an expert to be recommended to address the query based on the ranking.

The expert identifier 330 can identify a pool of prospective experts that may be capable of addressing the query. This can be completed in a variety of manners. In embodiments, the expert identifier 330 can first ascertain (e.g., using NLP techniques) relevant information (e.g., a topic and/or a set of keywords) associated with a query. The expert identifier 330 can then utilize the relevant information associated with the query to identify a pool of prospective experts that may be capable of addressing the query.

In some embodiments, the relevant information associated with the query can be compared against an expert database 345 to determine whether there is a substantial match between any experts within the expert database 345 and the relevant information of the query. The expert database 345 can contain data from a variety of sources compiled into individual expert profiles for respective users. For example, the expert database 345 can include information such as professional profiles (e.g., employee pages, descriptors, etc.), social media data, professional history (e.g., experience, previous jobs, projects undertaken, etc.), education history, personal information (e.g., hobbies, traveling experience, etc.), and credentials (e.g., registration numbers, degrees, certifications, etc.).

A matching algorithm (e.g., tf-idf, BM-25, Rabin-Karp, Knuth-Morris-Pratt, Naïve, Boyer-Moore, etc.) can then be applied between relevant information (e.g., a topic or set of keywords) of the query and the expert profiles. If there is a match between the relevant information of the query and any expert profiles, such expert profiles can be included in the list of prospective experts. For example, if a query presented by a user is determined to be related to a topic "Machine Learning," any expert found to be involved in the topic "Machine Learning" (based on their expert profiles) can be identified as a prospective expert capable of addressing the query.

In some embodiments, thresholds can be implemented to determine whether to include users within the pool of prospective experts. For example, a threshold number of years of experience can be implemented such that only users with years of experience exceeding the threshold number of years are considered within the pool of prospective experts. As another example, only users with a particular degree, credential, or work title may be considered as prospective experts for a particular topic. As an example, if a topic is "Quantum Computing," only individuals with a Doctor of Philosophy (PhD) and with relevant experience in the field of "Quantum Computing" may be considered as prospective experts to address the query associated with the topic "Quantum Computing." The pool of prospective experts can be filtered in any other suitable manner.

In some embodiments, experts can be identified by parsing the chat database 315. For example, the relevant information of a query (topics and/or keywords) can be searched within the chat database 315 (e.g., using a matching algorithm) to identify users who have engaged in conversation about the relevant information. In other words, if a user routinely engages in a topic associated with the query, the user can be identified as a prospective expert. For example, if a query is directed to a particular mainframe computer series: "Series 2000," the term "Series 2000" can be extracted as a relevant keyword. The chat database 315 can then be searched for the term "Series 2000" (and any other alternative language, such as "S2000") to identify individuals who discussed the term "Series 2000". Such users can be designated as prospective experts. In some embodiments, a threshold number of "hits" can be applied such that only users who routinely engage in conversation about relevant query topics are considered. Following an example above, if a threshold number of hits for the term "Series 2000" is required to be 100, then only users who have used the term "Series 2000" 100 times (e.g., within a particular time frame) would be considered as prospective experts.

Upon identifying a pool of prospective experts, the expert ranker 335 ranks the experts within the pool. In embodiments, the expert ranker 335 ranks the pool of experts using a weighted formula considering one or more factors. For example, the expert ranker 335 can utilize a formula: Expert Score=$factor_1 \times weight_1 + factor_2 \times weight_2 \ldots + factor_n \times weight_n$ to determine rankings for respective experts. Factors can include the information described above with respect to criteria relevant for selecting a pool of prospective experts (e.g., data stored in the expert database 345 and chat database 315). For example, a first factor can include years of experience, a second factor can include education credentials, a third factor can include chat history hits on a particular topic, etc.

As a detailed example, assume years of experience are mapped to a first factor score as follows: 0-1 year—score: 0.00, 1-3 years—score: 0.25, 3-5 years—score: 0.50, 5-7 years—score: 0.75, and 7+years—score: 1.00. Further assume educational credentials are mapped to a second factor score as follows: high school education—score: 0.20, associate's degree—score: 0.40, bachelor's degree—score: 0.60, master's degree—score: 0.80, PhD—score 1.00. Further assume chat hits on a particular topic "Linear Tape File System" are mapped to a third factor score as follows: 0-10 hits—score: 0.25, 10-20 hits—score: 0.50, 20-50 hits—score: 0.75, and 50+hits—score: 1.00. Lastly, assume that the first factor score (corresponding to years of experience) is weighted with a first weight of 0.50, assume that the second factor score (corresponding to educational credentials) is weighted with a second weight of 0.15, and assume that the third factor score (corresponding to chat hits on the topic "Linear Tape File System") is weighted with a third weight of 0.35.

Following the example above, assume three individuals are identified as prospective experts. The first individual has 6 years of professional experience, a master's degree, and is identified to have 25 hits on the topic "Linear Tape File System" (the term "Linear File Tape System" was found 25 times within the first individual's chat history). The second individual has 2 years of experience, a PhD, and is identified to have 15 hits on the topic "Linear Tape File System." The third individual has 10 years of experience, a bachelor's degree, and is identified to have 150 hits on the topic "Linear Tape File System." In this example, the scores would be calculated as follows: First Expert Score=(0.75×0.5)+(0.80× 0.15)+(0.75×0.35)=0.76, Second Expert Rank=(0.25×0.5)+ (1.00×0.15)+(0.50×0.35)=0.45, and Third Expert Rank= (1.00×0.5)+(0.60×0.15)+(1.00×0.35)=0.94. As such, in this example, the third expert is ranked first with a 0.94 expert score, the first expert is ranked second with a 0.76 expert score, and the second expert is ranked third with a 0.45 expert score.

It is noted that any suitable number of criteria can be considered when calculating an expert rank. For example, in some embodiments, the expert rank can be calculated with a single unweighted factor. Conversely, in some embodiments, the expert rank can be calculated using ten different factors of varying weights.

Further, the criteria can be mapped to factor values in any suitable manner. In the example above, categories or ranges were mapped to score values. However, in some embodiments, relationships (e.g., linear, exponential, logarithmic, polynomial, etc.) can be established between criteria and factor score values. For example, years of experience can be mapped to factor score values using a linear formula with a limit. As an example, a score for years of experience can be calculated according to a formula experience factor score=0.10×(years of experience), with a limit of 1.00 when 10 years of experience is attained. As such, an individual with 5 years of experience would have a factor score of 0.5, an individual with 8 years of experience would have a factor score of 0.8, an individual with 11 years of experience would have a factor score of 1.00, etc.

In some embodiments, if particular experts do not meet a minimum expert score, they are removed from the ranked list. For example, following the example above, if the minimum expert score required to remain on the expert list is 0.50, only the third (0.94) and first (0.76) experts would be included on the list, as the second expert (0.45) does not meet the minimum expert score.

The expert ranker 335 then transmits the ranked expert list to the expert recommender 340. The expert recommender 340 then selects a first ranked expert on the list. Following the example above, the third expert with an expert score of 0.94 would be selected as the first ranked expert. The third expert can then be recommended to the chat dispatcher 350.

The chat dispatcher 350 then transmits either the answer received from the answer retriever 320 or the first ranked expert received from the expert recommender 340 to the device 305, depending on whether a corresponding query was identified by the query analyzer 310 and/or whether a correct answer was retrieved from the answer retriever 320.

In some embodiments, the chat dispatcher 350 retrieves the entire chat log including the answer retrieved from the answer retriever 320 and transmits the chat log to the device 305 such that the user can comprehensively review the chat for which the answer was retrieved. In some embodiments, the chat dispatcher 350 only transmits an extracted answer to the device 305. In some embodiments, the chat dispatcher transmits the triple in the format of <query, answer, confidence> to the user. In embodiments, if the user associated with the device 305 acknowledges the answer as correct, the confidence score for the answer can be increased, as it successfully addressed the user's query.

In some embodiments, the chat dispatcher 350 initiates a chat window between the user and the first ranked expert. In these embodiments, the query can be automatically input into the chat window between the user and the first ranked expert. This can allow the first ranked expert to address the query in real-time with the user. In embodiments, if the first ranked expert is not available, the expert list can be iterated through (e.g., in descending order) until an available expert is located. Availability can be gauged based on a predetermined time period (e.g., 5 minutes, 10 minutes, 20 minutes, etc.) passing without a response.

In some embodiments, the chat dispatcher 350 can transmit contact information of the first ranked expert to the device 305 such that the user of the device 305 can reach out to the first ranked expert in the future. In some embodiments, the chat dispatcher 350 can transmit the entire ranked list of experts to the user such that they can reach out to one or more experts on the list. In some embodiments, the chat dispatcher 350 can transmit the query to the first ranked expert in any other suitable manner (e.g., over email).

Upon transmitting the answer retrieved by the answer retriever 320 or upon linking the user of the device 305 with an expert, the chat management system 301 can await for future queries.

It is noted that FIG. 3 is intended to depict the representative major components of an example computing environment 300. In some embodiments, however, individual components can have greater or lesser complexity than as represented in FIG. 3, components other than or in addition to those shown in FIG. 3 can be present, and the number, type, and configuration of such components can vary. For example, in some embodiments, the chat management system may not include an expert recommendation module 325, as the system may only be configured to retrieve answers for matching queries.

Figure 4A:
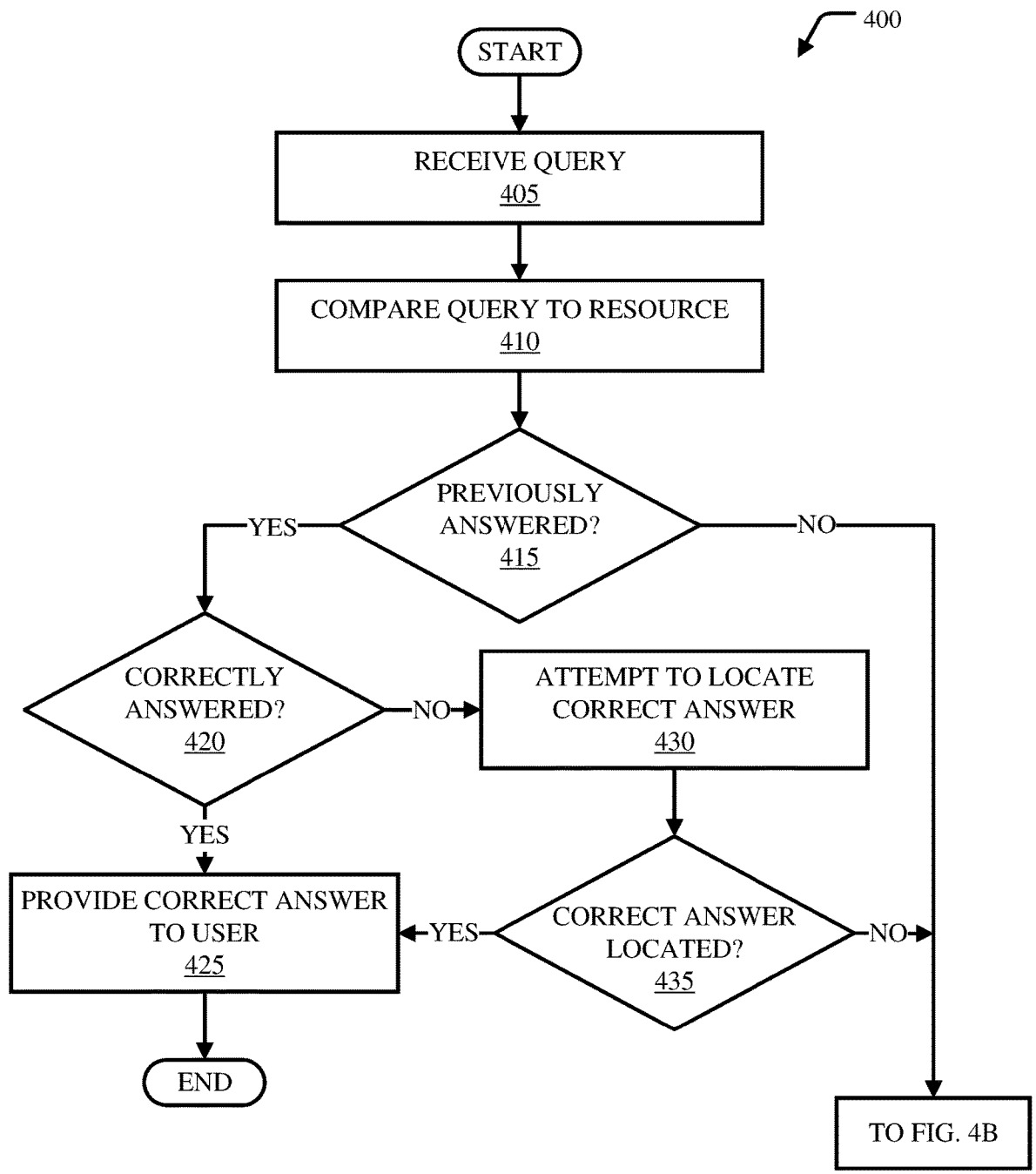
FIG. 4A and FIG. 4B are flow-diagrams collectively illustrating an example method for addressing a query, in accordance with embodiments of the present disclosure.
Figure 4B:
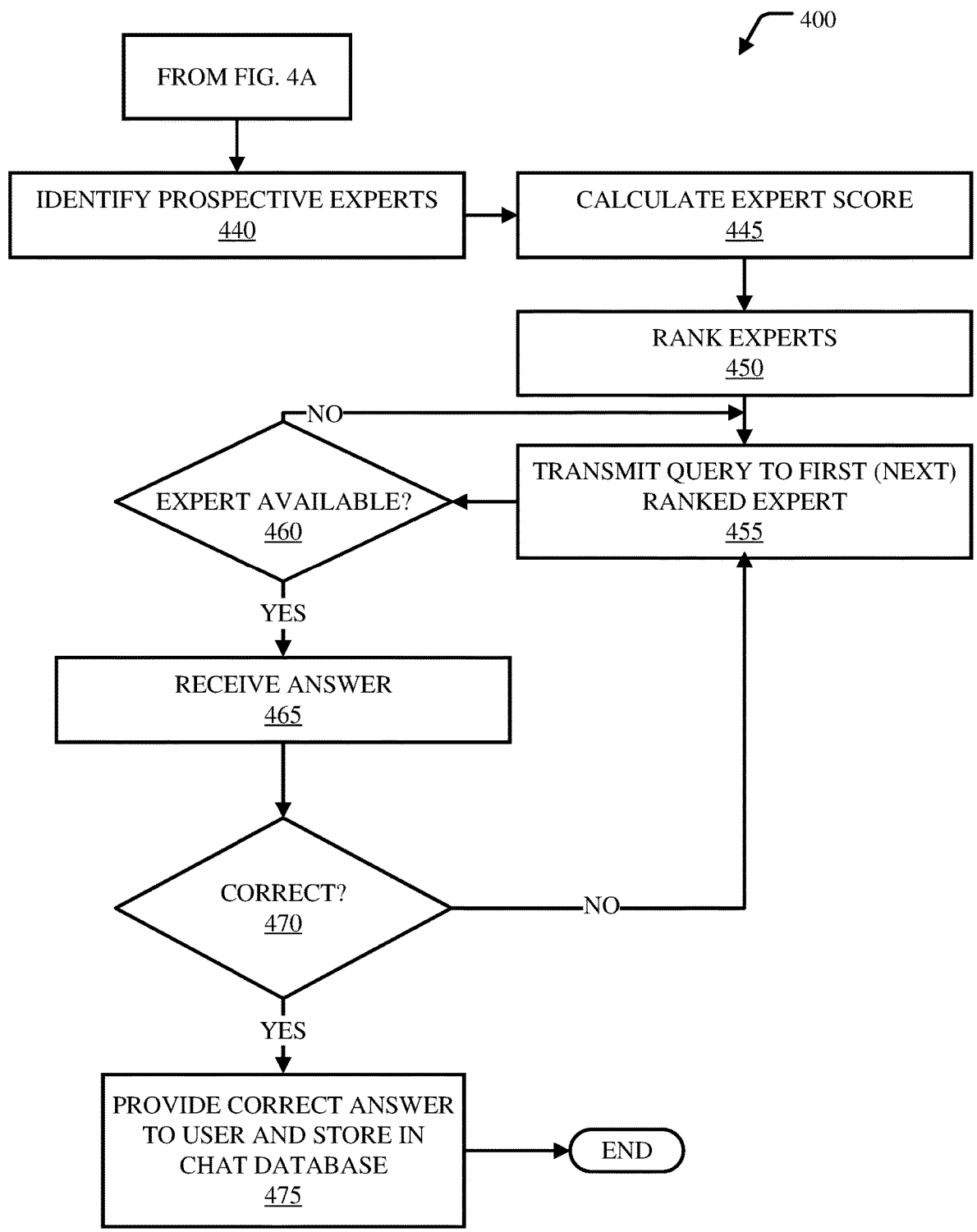

FIG. 4A and FIG. 4B are flow diagrams collectively illustrating an example method 400 for addressing a query, in accordance with embodiments of the present disclosure. FIG. 4A is directed to attempting to locate an answer for a current query, in accordance with embodiments of the present disclosure. FIG. 4B is directed to attempting to connect a querying user with an expert who may be capable of addressing the query, in accordance with embodiments of the present disclosure. The method 400 can be performed using the systems/methods described herein (e.g., chat management application 160, natural language processing system 212, chat management system 301, computer system 501, etc.).

Method 400 initiates at operation 405, where a query is received. The query can be received in an instant messaging (IM), group chat, or collaboration environment over a network. The query can be received in text and can be stored for analysis.

The query is then compared to a resource. This is illustrated at operation 410. The resources the query can be compared to include the resources described with respect to the query analyzer 310 of FIG. 3. For example, the query can be compared against a chat database (e.g., chat database 315), results within a search engine, a Q/A website, a forum, a blog, etc. The query can be compared against the resource using a matching algorithm, such as the matching algorithms described with respect to FIG. 2 (e.g., a string similarity algorithm).

A determination is then made whether the query was previously answered. This is illustrated at operation 415. This can be completed by analyzing the information surrounding the query (e.g., metadata, responses, keywords, etc.) to determine whether the query was answered. If the query has not been answered, then operation 415 proceeds to FIG. 4B (to the expert recommendation flow).

If the query has been answered, then a determination can be made whether the query was correctly answered. This is illustrated at operation 420. Validating the answer can be completed using the methods described with respect to the answer retriever 320 of FIG. 3. For example, the query can be compared to an external source or validated by an expert. In some embodiments, the answer is determined to be correct in response to a confidence that the answer is correct exceeding a confidence threshold. If a determination is made that the answer to the query is correct, then method 400 proceeds to operation 425, where the correct answer is provided to the user.

If a determination is made that the answer to the query is incorrect, then an attempt is made to locate a correct answer. This is illustrated at operation 430. In some embodiments, additional search results are searched in order to attempt to find a correct answer. In some embodiments, the search criteria for finding an answer to the query can be modified such that different answers are returned. For example, topics or keywords related to the query which are searched in a chat database can be altered to attempt to find alternative answers.

A determination is made whether a correct answer is located. This is illustrated at operation 435. This can be completed substantially similar to operation 420 (e.g., by referencing an external source). If the correct answer is located, then the correct answer is provided to the user at operation 425. If the correct answer is not located, then operation 435 proceeds to FIG. 4B (to the expert recommendation flow).

Turning now to FIG. 4B, from either operation 415 or 435, method 400 proceeds at operation 440, where prospective experts are identified. Prospective experts can be identified using the same, or substantially similar, techniques described with respect to the expert identifier 330 of FIG. 3. For example, prospective experts can be identified by implementing a matching algorithm between relevant criteria of a query and an expert database. In some embodiments, prospective experts can be identified by searching for relevant information (keywords) of a query in a chat database.

Expert scores are calculated for prospective experts. This is illustrated at operation 445. Expert scores can be calculated using the same, or substantially similar, techniques described with respect to the expert ranker 335 of FIG. 3. For example, the expert scores can be calculated using a plurality of weighted factors (e.g., from an expert database or chat database).

The experts are then ranked based on their respective expert scores. This is illustrated at operation 450. The expert ranks denote their probabilistic ability to be able to correctly answer the query based on the applied ranking algorithm. As such, high ranked experts may have a relatively high likelihood of correctly addressing the query, whereas low ranked experts may have a relatively low likelihood of correctly addressing the query.

The query is then transmitted to the first ranked expert on the list. This is illustrated at operation 455. In embodiments, a chat window can automatically be created between the expert and the querying user with the query as an initial input. In some embodiments, the query can be emailed, messaged, or otherwise communicated to the expert.

A determination is then made whether the expert is available. This is illustrated at operation 460. Determining whether the expert is available can be completed by determining whether a response is received within a predetermined time period (e.g., 5 minutes, 30 minutes, 1 hour, 1 day, etc.). If a response is not received within a predetermined time period, then a determination can be made that the expert is not available. Conversely, if a response is received within a predetermined time period, then a determination can be made that the expert is available.

If a determination is made that the expert is not available, then operation 460 returns to operation 455 where the query is transmitted to the next ranked expert on the list. If a determination is made that the expert is available, then an answer is received from the expert. This is illustrated at operation 465. The answer can then be validated at operation 470. For example, the answer can be cross-referenced against an external source (e.g., an online encyclopedia, publication, or manual) to determine whether the answer is correct.

If the answer is not correct, then operation 470 can return to operation 455 where the query is transmitted to the next ranked expert. If the answer is validated as correct, then the correct answer is transmitted to the user. This is illustrated at operation 475. In some embodiments, the query and correct answer can be stored in a chat database (e.g., chat database 315 of FIG. 3) for later reference. Method 400 then ends.

The aforementioned operations can be completed in any order and are not limited to those described. Additionally, some, all, or none of the aforementioned operations can be completed, while still remaining within the spirit and scope of the present disclosure.

Figure 5:
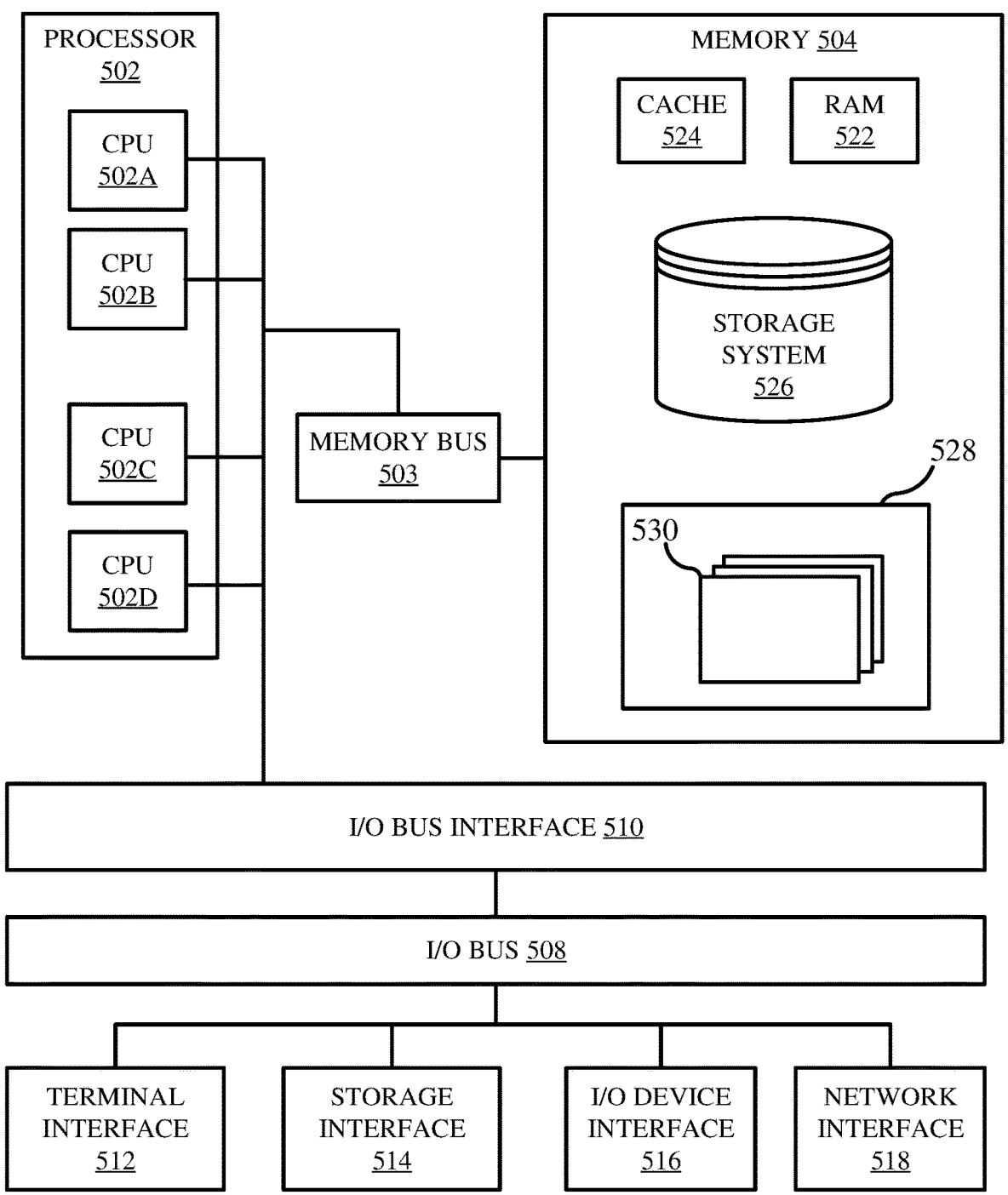
FIG. 5 is a high-level block diagram illustrating an example computer system that can be used in implementing one or more of the methods, tools, and modules, and any related functions described herein, in accordance with embodiments of the present disclosure.

Referring now to FIG. 5, shown is a high-level block diagram of an example computer system 501 that may possibly be utilized in various devices discussed herein (e.g., devices 105, server 135, natural language processing system 212, device 305, chat management system 301) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

In some embodiments, the program modules 530 of the computer system 501 may include a chat management module. The chat management module can be configured to receive a query. The query can be analyzed to determine whether it has already been answered. If a determination is made that the query has been answered, then the answer can be retrieved and transmitted to the querying user. If a determination is made that the query has not been answered, then prospective experts who may be capable of addressing the query can be identified. The prospective experts can then be ranked by the chat management module. The query can then be transmitted to a first ranked expert and an answer can be received from the first ranked expert.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
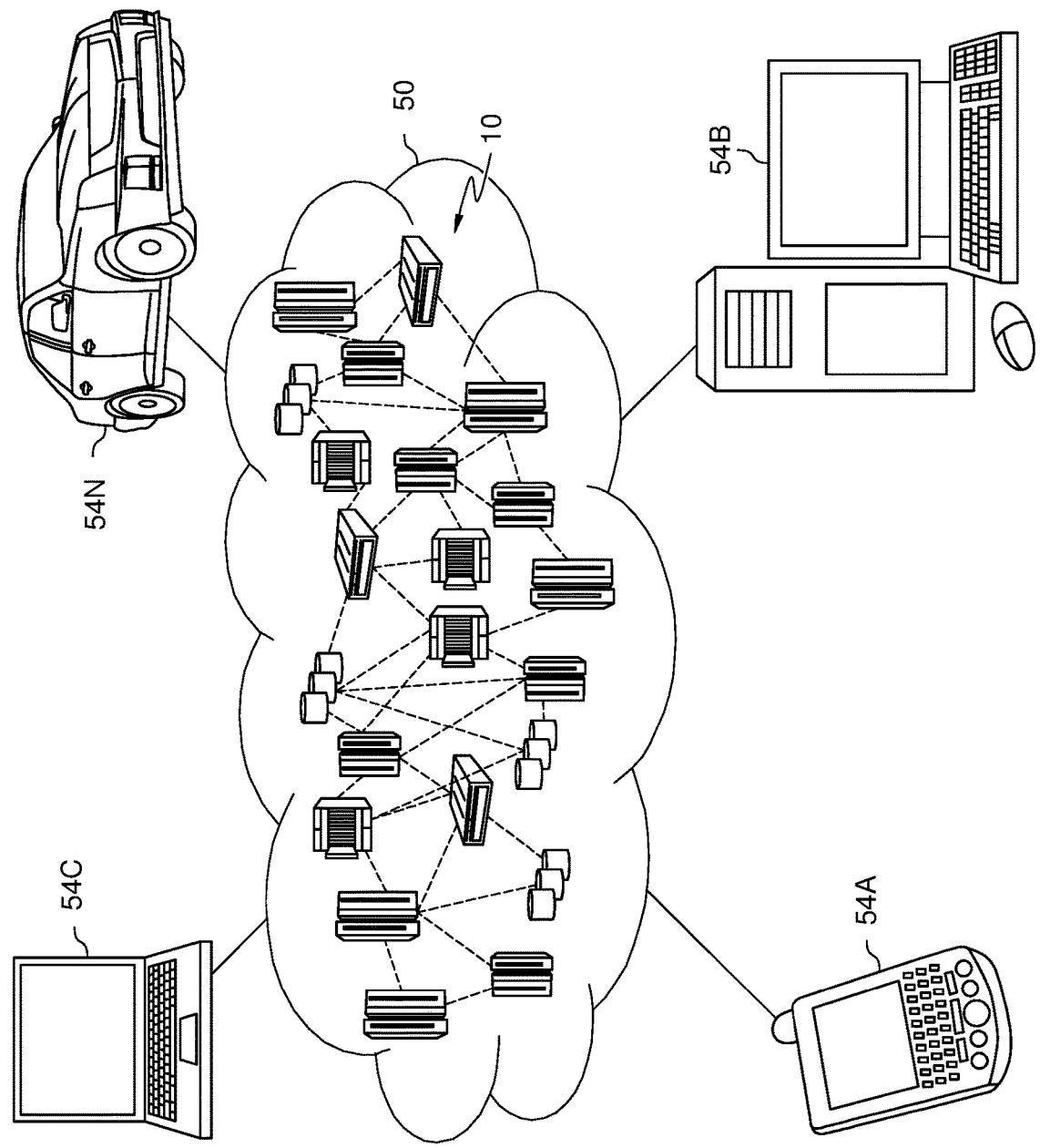
FIG. 6 is a diagram illustrating a cloud computing environment, in accordance with embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105, device 305, etc.), desktop computer 54B (e.g., server 135, chat management system 301), laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
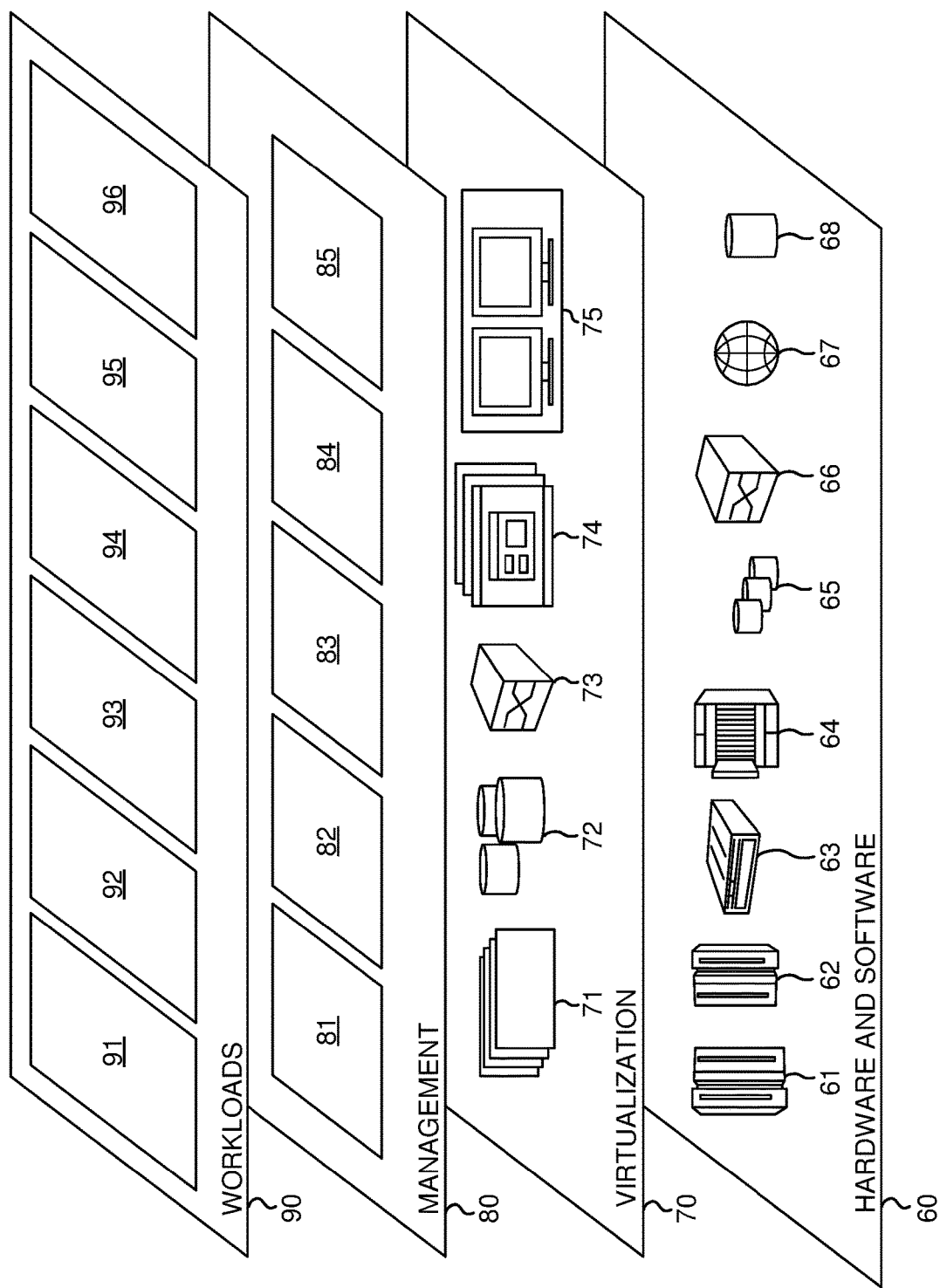
FIG. 7 is a block diagram illustrating abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chat management 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   receiving a query from a user within an instant messaging chat environment;
   determining whether the query has already been answered by comparing the query to text within a chat database, wherein the chat database stores textual chat history data which occurred over the instant messaging chat environment;
   identifying, in response to determining that the query has not been answered, a set of prospective experts;
   ranking each prospective expert of the set of prospective experts based on a plurality of factors, each of the plurality of factors having a weight, wherein a first factor of the plurality factors is an experience factor, wherein a first factor score of the first factor is based on a number of years of experience, wherein a second factor of the plurality of factors is an education factor, wherein a second factor score of the second factor is based on a level of education, wherein a third factor of the plurality of factors is a keyword match factor, wherein a third factor score of the third factor is based on a number of times a keyword within the query appears within chat history of each prospective expert;
   identifying a first ranked expert based on the ranking, wherein the first ranked expert is a highest ranked expert of the set of prospective experts based on the plurality of factors;
   initiating a chat window between the user and the first ranked expert to allow the first ranked expert to address the query in real-time with the user;
   receiving an answer to the query from the first ranked expert within the chat window;
   validating the answer received from the first ranked expert by referencing an external source;
   increasing a confidence score that the answer is a correct answer based on the answer being validated; and
   outputting a triple including the query, the answer, and the confidence score.

2. The method of claim 1, wherein the set of prospective experts is filtered based on at least one threshold prior to ranking.

3. The method of claim 1, further comprising:
   receiving a second query;
   determining whether the second query has already been answered by comparing the second query to text within the chat database; and
   retrieving, in response to determining that the second query has already been answered, an answer to the second query from the chat database.

4. A system comprising:
   a memory storing program instructions; and
   a processor, wherein the processor is configured to execute the program instructions to perform a method comprising:

receiving a query from a user within an instant messaging chat environment;

determining whether the query has already been answered by comparing the query to text within a chat database, wherein the chat database stores textual chat history data which occurred over the instant messaging chat environment;

identifying, in response to determining that the query has not been answered, a set of prospective experts;

ranking each prospective expert of the set of prospective experts based on a plurality of factors, each of the plurality of factors having a weight, wherein a first factor of the plurality factors is an experience factor, wherein a first factor score of the first factor is based on a number of years of experience, wherein a second factor of the plurality of factors is an education factor, wherein a second factor score of the second factor is based on a level of education, wherein a third factor of the plurality of factors is a keyword match factor, wherein a third factor score of the third factor is based on a number of times a keyword within the query appears within chat history of each prospective expert, wherein the number of times the keyword within the query appears within chat history of each prospective expert is determined by:
  extracting the keyword from the query; and
  searching chat history of each prospective expert for the number of times the keyword appears within the chat history of each prospective expert;

identifying a first ranked expert based on the ranking, wherein the first ranked expert is a highest ranked expert of the set of prospective experts based on the plurality of factors;

initiating a chat window between the user and the first ranked expert to allow the first ranked expert to address the query in real-time with the user; and receiving an answer to the query from the first ranked expert within the chat window.

5. The system of claim 4, wherein the set of prospective experts is filtered based on at least one threshold prior to ranking.

6. The system of claim 4, wherein the method performed by the processor further comprises:
  determining whether the answer is correct;
  transmitting, in response to determining that the answer is incorrect, the query to a second ranked expert; and
  receiving an answer from the second ranked expert.

7. The system of claim 4, wherein the method performed by the processor further comprises:
  receiving a second query;
  determining whether the second query has already been answered by comparing the second query to text within the chat database; and
  retrieving, in response to determining that the second query has already been answered, an answer to the second query from the chat database.

8. A computer program product comprising a computer readable storage medium having program instructions embodied therewith, the program instructions executable by a processor to cause the processor to perform a method comprising:
  receiving a query from a user within an instant messaging chat environment;
  determining whether the query has already been answered by comparing the query to text within a chat database, wherein the chat database stores textual chat history data which occurred over the instant messaging chat environment;
  identifying, in response to determining that the query has not been answered, a set of prospective experts;
  ranking each prospective expert of the set of prospective experts based on a plurality of factors, each of the plurality of factors having a weight, wherein a first factor of the plurality factors is an experience factor, wherein a first factor score of the first factor is linearly based on a number of years of experience, wherein a second factor of the plurality of factors is an education factor, wherein a second factor score of the second factor is exponentially based on a level of education, wherein a third factor of the plurality of factors is a keyword match factor, wherein a third factor score of the third factor is based on a number of times a keyword within the query appears within chat history of each prospective expert;
  identifying a first ranked expert based on the ranking, wherein the first ranked expert is a highest ranked expert of the set of prospective experts based on the plurality of factors;
  initiating a chat window between the user and the first ranked expert to allow the first ranked expert to address the query in real-time with the user; and
  receiving an answer to the query from the first ranked expert within the chat window.

9. The computer program product of claim 8, wherein the set of prospective experts is filtered based on at least one threshold prior to ranking.

10. The computer program product of claim 8, wherein the method performed by the processor further comprises:
  determining whether the answer is correct;
  transmitting, in response to determining that the answer is incorrect, the query to a second ranked expert; and
  receiving an answer from the second ranked expert.

11. The computer program product of claim 8, wherein the method performed by the processor further comprises:
  receiving a second query;
  determining whether the second query has already been answered by comparing the second query to text within the chat database; and
  retrieving, in response to determining that the second query has already been answered, an answer to the second query from the chat database.

* * * * *